(12) United States Patent
Deseure et al.

(10) Patent No.: US 10,428,433 B2
(45) Date of Patent: Oct. 1, 2019

(54) METHOD TO REGENERATE OXYGEN TRAPS

(71) Applicants:Universite Grenoble Alpes, Grenoble (FR); Centre National de la Recherche Scientifique, Paris (FR)

(72) Inventors: Jonathan Deseure, Challes les Eaux (FR); César Marlu Steil, Voiron (FR)

(73) Assignees: UNIVERSITE GRENOBLE ALPES, Saint Martin d'Heres (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 290 days.

(21) Appl. No.: 14/976,288

(22) Filed: Dec. 21, 2015

(65) Prior Publication Data

US 2016/0177458 A1    Jun. 23, 2016

(30) Foreign Application Priority Data

Dec. 22, 2014  (FR) ..................................... 14 63105

(51) Int. Cl.
| | | |
|---|---|---|
| *B01J 20/34* | (2006.01) | |
| *C25B 15/02* | (2006.01) | |
| *C25B 1/00* | (2006.01) | |
| *B01D 53/02* | (2006.01) | |
| *B01D 53/96* | (2006.01) | |
| *B01J 20/02* | (2006.01) | |

(52) U.S. Cl.
CPC .............. *C25B 15/02* (2013.01); *B01D 53/02* (2013.01); *B01D 53/96* (2013.01); *B01J 20/02* (2013.01); *B01J 20/3441* (2013.01); *C25B 1/00* (2013.01); *B01D 2257/104* (2013.01)

(58) Field of Classification Search
CPC .... B01D 53/261; B01D 53/965; B01D 53/96; G01N 27/00–92; B01J 20/3441; B01J 20/34; C25B 15/02; C25B 15/08
USPC .................................... 210/670, 673; 205/81
See application file for complete search history.

(56) References Cited

U.S. PATENT DOCUMENTS 3,963,597 A * 6/1976 Kleitz ...................... B01J 20/06
                                                                    204/194
5,334,237 A    8/1994 Lorimer
6,143,162 A    11/2000 Boivin

FOREIGN PATENT DOCUMENTS

| FR | 2 230 402 | 12/1974 |
| FR | 2 770 149 A1 | 4/1999 |
| WO | 95/32050 A1 | 11/1995 |

OTHER PUBLICATIONS

Fouletier et al (Vacuum, vol. 25, issue 7, 1975, pp. 307-314) (Year: 1975).*

(Continued)

*Primary Examiner* — Alexander W Keeling
(74) *Attorney, Agent, or Firm* — Pearne & Gordon LLP

(57) ABSTRACT

A method is described to regenerate an oxygen trap, comprising at least the following steps: circulating a current in the trap material (2) to reduce this material; measuring the value $I_m$ of the current and estimating its derivative $dI_m/dt$ in relation to time; estimating the length ($\delta$) of material reduced by the current as a function of the value of the current and its derivative; stopping circulation of the current when the length of reduced material is at least equal to a threshold value ($\delta_s$).

12 Claims, 4 Drawing Sheets

(56) References Cited

OTHER PUBLICATIONS

Vecchio et al (Chemical Engineering Science, vol. 59, issue 12, 2004, pp. 2389-2400). (Year: 2004).*
Actualités Chimie, Piège a Oxygène Electriquement Regénérable de Haute Efficacité, Jul. 3, 1974.
J. Fouletier et al., "Electrically renewable and controllable oxygen getter" Vacuum, vol. 26, No. 7, Jul. 1, 1975.
Search Report issued in French Patent Application No. FR 14 63105 dated Jul. 31, 2015.

* cited by examiner

METHOD TO REGENERATE OXYGEN TRAPS

TECHNICAL FIELD AND STATE OF THE PRIOR ART

The invention concerns the field of oxygen pumps or traps also known as «getters».

Oxygen traps are a reliable technical solution to remove every trace of oxygenated pollutants in a gas. For example, the use at high temperature (between 600° C. and 900° C.) of a regenerative oxygen trap was proposed as early as 1973 in document U.S. Pat. No. 3,963,597. The device proposed in this document is based on the difference in thermodynamic potential between partly reduced zirconium oxide and pollutants (in the order of potentials from the highest to the lowest: $CO_2>H_2O>CO>NO$). A good candidate for this purpose is reduced 8 mole % yttrium-stabilized zirconium. It exhibits very good stability under a reducing gas, under hydrogen in particular, and excellent forming properties.

In particular this document describes a variant for continuous operation. However, the variation in existing volume during reduction followed by re-oxidation does not allow reliable gas-tightness for continuous operation mode. The reduction current is determined from an estimate of the pollution level of the gas entering the cell.

The document by J. Foultier et al., Vacuum, 25, 1975, 307 proposes a solid solution of $ZrO_2(0.86)$ $Y_2O_3(0.1)CeO_2(0.04)$ or $ZrO_2(0.9)Y_2O3(0.09)CeO_2(0.01)$. It is shown therein that 100 grams of said trap is able to trap 1 NI of dioxygen. According to the article «Actualités chimie» N° 1534-3, July 1974, pages 24-28, after 6 months' use and more than 50 regeneration cycles, the sample shows no degradation. Finally, under argon the performance of pollutant removal is largely dependent on the flow of gas passing through the trap. It has been demonstrated via numerical simulations and by the study of dimensionless numbers (Pe, Sc, Sh), that it is dependent on the type of gas (dihydrogen or argon). In this type of technique, after the oxygen has been trapped by the constituent material of the trap followed by oxygen saturation of this material, the problem arises of the regeneration thereof.

This is obtained by circulating a current as described in the aforementioned documents.

Although very simple, this technique has never been automated. According to known regeneration techniques, the type of gas passing through the cell is changed and the level of re-oxidation of the trap is measured using high frequency impedance. Finally, the reversibility of this regeneration under highly reducing gas (hydrogen) has never been clearly demonstrated.

The needs of this type of «getter» device are increasing together with hydrogen applications. Pure hydrogen is chiefly recommended for analytical chemistry applications (GPC). The packaging of hydrogen for on-hydride storage must take into account the constraints laid down by the hydride container with regard to tolerance of the presence of oxygen ($\leq 10$ ppm $d'O_2$).

It is therefore important to propose a reliable, robust solution to guarantee the high purity of a gas such as hydrogen. Finally for use of hydrogen in fuel cells, owing to the diversity of possible hydrogen sources, it is similarly of importance to obtain guaranteed quality in terms of purity, free of oxygenated pollutants e.g. carbon monoxide (<60 ppm de CO).

The problem therefore arises of finding a novel method for regenerating the constituent material of an oxygen trap.

In addition, in known regeneration methods, the halting of regeneration is arbitrary without any well-established criterion.

The problem therefore also arises of finding a method to regenerate the constituent material of an oxygen trap which allows the determination of an easy criterion for halting regeneration.

Said method to regenerate the constituent material of an oxygen trap can preferably be automated, allowing regeneration to be stopped on the basis of an objective criterion and/or an easily determined or calculated parameter.

DISCLOSURE OF THE INVENTION

The invention sets out to solve these problems.

First it concerns a method to regenerate an oxygen trap, comprising at least the following steps:

a) circulating a current in the trap material to reduce this material;

b) measuring the value $I_m$ of said current and estimating its derivative $dI_m/dt$ in relation to time;

c) estimating the length ($\delta$) of material reduced by said current, as a function of the value of said current ($I_m$) and of its derivative ($dI_m/dt$), d) stopping the circulation of the current when the length of reduced material is at least equal to a threshold value ($\delta_s$).

The length of reduced material may be a function of the ratio $I_m^2/(dI_m/dt)$ between the square of measured current and its derivative.

It is also possible to measure or estimate the contribution to the measured current made by electrochemical reductions of pollutants in the environment of the trap.

It is then possible to estimate the length ($\delta$) of reduced material as a function of the value of measured current ($I_m$), of its derivative ($dI_m/dt$) and of the contribution to the measured current made by electrochemical reductions of pollutants.

For this purpose, it is possible to measure or record the value of the residual current $I_p=I(dI/dt=0)$ for a zero or near-zero derivative of the current, for example at zero potential difference or by interrupting current circulation; it is then possible to estimate the length of reduced material as a function of the value of the current ($I_m$), of its derivative ($dI_m/dt$) and value of the current ($I(dI/dt=0)$) for a zero or near-zero derivative thereof. Interruption of the current and measurement of the value of the current (Ip), in particular for a zero or near-zero derivative thereof, can be performed at regular time intervals e.g. between 5 s and 100 s.

As a variant, the instant (maximum) value of the current can be estimated when it is interrupted or at the time of interruption of the regeneration; this value can then be ten to one hundred times higher than $I_p=I(dI/dt=0)$ and this method can therefore be accompanied by a calibration (of $Ip \propto I_{inst\Delta E=0}$) (this calibration depending on the frequency of acquisition).

Finally, other methods exist which can be used to determine the influence on $I_m$, of the concentration of this pollution surrounding the getter or the surface thereof, or the contribution to the measured current $I_m$ made by electrochemical reductions of pollutants in the environment: fast-scan voltammetry or square-wave potential technique or low frequency complex impedance spectroscopy. These methods can be accompanied by a calibration step; results are related to Ip by correlation.

The estimated length of material can be a function of the ratio $I_m(I_m-I_p)/(dI_m/dt)$ between first the product of the current and of the current, minus, or corrected for, the current related to oxygen pollution of the gas circulating around the trap, and secondly the derivative of the current.

Regeneration can take place for example at a temperature between 600° C. and 900° C.

The invention also concerns a device to regenerate an oxygen trap, comprising at least:

a) means to circulate a current in the trap material for reduction thereof;

b) means to measure the value of said current and to calculate its derivative;

c) means to estimate the length of reduced material as a function of the value of said current and of its derivative;

d) means to stop circulation of the current when the length of reduced material is equal to a threshold value.

Means can be provided to measure or estimate the contribution to the measured current made by electrochemical reductions of pollutants in the environment of the trap.

Means can allow estimation of the length ($\delta$) of reduced material as a function of the value of the measured current ($I_m$), of its derivative ($dI/dt$) and of the contribution, to the measured current, made by electrochemical reductions of pollutants.

Said device may further comprise means to measure or record the value of the residual current $I_p=I(dI/dt=0)$, for a zero or near-zero derivative of the current e.g. at zero potential difference or by interrupting circulation of the current; means then allowing estimation of the length of reduced material as a function of the value of the current ($I_m$), of its derivative ($dI_m/dt$) and of the value of the current ($I(dI/dt=0)$) for a zero or near-zero derivative thereof. Preferably current interruption means, in particular for a zero or near-zero derivative of the current, allow measurement of the value of the current (Ip) at regular time intervals e.g. between 5 s and 100 s.

As a variant, there are means allowing interruption of regeneration and means allowing estimation of the instant (or maximum) value of the current at the time of this interruption; this value may then be ten to one hundred times higher than $I_p=I(dI/dt=0)$; means can therefore be provided for calibration (of $I_p \propto I_{inst\Delta E=0}$) (calibration depending on acquisition frequency).

Finally, means can be provided to implement other methods which can be applied to determine the influence on $I_m$ of the concentration of the pollution surrounding the getter or the surface thereof, or the contribution, to the measured current $I_m$, made by electrochemical reductions of environment pollutants: fast-scan voltammetry or square-wave potential technique, or low frequency complex impedance spectroscopy. Means can be provided to allow calibration and/or correlation to relate results to Ip.

Means can be provided or programmed to:

interrupt circulation of the current and to measure the value of the current ($I_p=I(dI/dt=0)$) for a zero or near-zero derivative thereof and/or to measure the maximum value of the current at the time of interruption, or any other conventional electrochemical method allowing determination of the concentration of pollutants and to infer $I_p$ therefrom;

and/or to trigger means to circulate a current in the trap material to reduce this material.

In a method or device of the invention the trap material is a solid solution for example, usually used as solid electrolyte in a high temperature solid oxide fuel cell.

The «getter» material is any solid solution for example of ZrYO or ZrScO type, with or without double substitutions (of $Y_2O_3$ or $Sc_2O_3$, either by $CeO_2$ or by $Al_2O_3$); as a variant, this may a structure such as $ThO_2^-$ and $LaGaO_3^-$ similar to $ZrO_2^-$ bases with or without double substitutions (of $Y_2O_3$ or $Sc_2O_3$, either by $CeO_2$ or by $Al_2O_3$). Mention can also be made of $8(Y_2O_3)10(Al_2O_3)$ mixtures.

As an example, a zirconium solution can be used such as $Zr_{1-x}Y_xO_{2-x/2}$ or $Zr_{1-x}Sc_xO_{2-x/2}$ with x between 0.03 and 0.11. A solid solution with double substitution can also be used such as $ZrO_2(0.86)Y_2O_3(0.1)CeO_2(0.04)$ or $ZrO_2(0.9)Y_2O_3(0.09)CeO_2(0.01)$.

The trap material may be of elongate shape e.g. cylindrical or parallelepiped, optionally hollow, or in the shape of a pellet of hollow tube e.g. with circular or rectangular or square cross-section. It may be dense or porous.

The invention allows easy automation of control over regeneration of an oxygen trap.

DETAILED DESCRIPTION OF PARTICULAR EMBODIMENTS

Figure 1:
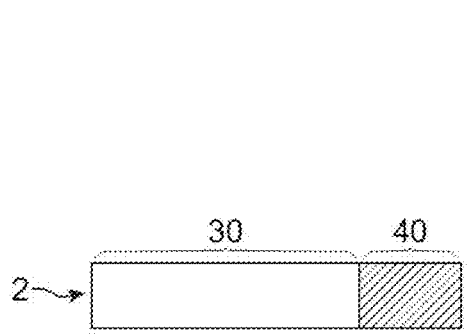
FIG. 1 illustrates an oxygen trap.

FIG. 1 schematically illustrates a bar 2 or sample able to be used in the invention.

For example, it is a sample of 8 mole % yttrium-stabilized zirconium (YSZ), stable under a reducing atmosphere.

Trap performance was not proven on this solid solution. The endurance thereof was previously tested by performing about ten reduction and re-oxidation cycles. It was also shown that this is possible under a hydrogen atmosphere.

As a variant it is possible, as getter material, to use any solid solution of ZrYO or ZrScO type, with or without double substitutions (of $Y_2O_3$ or $Sc_2O_3$, either by $CeO_2$ or by $AlO_3$) but also all structures such as $ThO_2$— and $LaGaO_3^-$ similar to $ZrO_2^-$ bases, with or without double substitutions (of $Y_2O_3$ or $Sc_2O_3$, either by $CeO_2$ or by $Al_2O_3$). Mention can also be made of $8(Y_2O_3)10 (Al_2O_3)$ mixtures.

As an example, a zirconium solution can be used such as $Zr_{1-x}Y_xO_{2-x/2}$ or $Zr_{1-x}Sc_xO_{2-x/2}$ with x between 0.03 and 0.11. A double substitution solid solution such as $ZrO_2(0.86)Y_2O_3(0.1)CeO_2(0.04)$ or $ZrO_2(0.9)Y_2O_3(0.09)CeO_2(0.01)$ can also be used.

The inventors have been able to determine that the behaviour of a getter follows dynamics which appear to be exclusively or chiefly related to the re-oxidation process of materials and not to inertia of the gas as described in the work conducted under argon in particular by J. Foultier et al., Vacuum, 25, 1975, 307.

An oxygen getter operating under a hydrogen atmosphere is able to capture a large amount of pollutant (in particular during pollution peaks) within a very short time, due to the very high diffusivity of pollutants in hydrogen. CFD code numerical simulation and the study of dimensionless numbers (Pe, Sc, Sh) prove that the purge rate has little influence on trap performance, since hydrogen has very good thermal diffusivity and a very high binary diffusion coefficient.

Regeneration tests were conducted by the inventors, evidencing an unusual behaviour of ceramic that has never been reported in the literature.

Modeling thereof is proposed below that is easy and robust and allows an explanation of this behaviour.

With this modeling it is possible to control the state of reduction by measuring the current as a function of time.

In the partly oxidized getter sample (the material of which is ytrrium-stabilized zirconium as indicated above) illustrated in FIG. 1, a region 30 of non-reduced zirconium can be seen and a black zirconium region 40 (reduced). These two regions are delimited by a reduction front 32 that is assumed to be planar.

Let $V_T$ (en $m^3$) be the volume of the sample and S its cross-section (in $m^2$).

Figure 2:
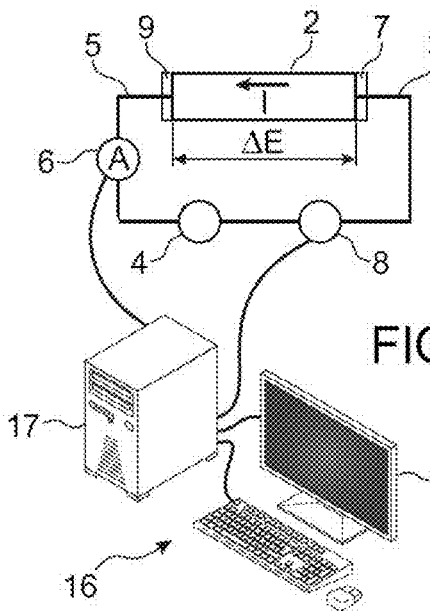
FIG. 2 illustrates a device to regenerate an oxygen trap implementing the invention.

As illustrated in FIG. 2, this sample can be incorporated in a circuit comprising a voltage source 4, means 6 to measure a current circulating in the sample, the assembly being linked in series by electrical connections 3, 5. The sample 2 is provided with electrodes 7, 9. A potential difference or a voltage is therefore applied to the terminals of the sample. This voltage is denoted $\Delta E$ (in V).

Through previous electrochemical characterization (e.g. by high frequency complex impedance spectroscopy) it is possible to determine an effective ionic conductivity $\sigma_{ion}^{eff}$, which is dependent on the morphology (porosity) of the sample.

An exchange current $K_0$ (in $A/m^2$) can be inferred therefrom; these values are also dependent on the morphology of the sample, in particular its active surface area, and it was also ascertained that $K_0$ is dependent on temperature range ($\pm 20°$ C.) and the range of applied potential ($\pm 0.5$V).

Finally, on the basis of the type of solid solution and the porosity thereof it is possible to estimate the concentration $C_1$ (in $mol/m^3$) of reducible oxygen contained in the material. This concentration is given by:

$$C_i = \frac{X_i}{V_i}$$

with i: 1 or 2

It relates to the number of moles of exchangeable oxygen in the regenerative length. $X_1$ represents the number of oxygen atoms which can be exchanged with the external gas surrounding the getter. $X_2$ represents the oxygens involved in internal exchanges but their physicochemical nature is unknown, and $C_2$ is their concentration.

Let Ohm's law expressed from this analysis be:

$$\Delta E_{ion} = \frac{X_1 C_1}{S \sigma_{ion}^{eff}} I_T \qquad (1)$$

where $\Delta E_{ion}$ is the non-measurable difference in ionic potential.

The following linearized electrochemical overvoltage law is proposed for $X_2 \geq 0$ and $0 \leq X_1 \leq C_1 V_T$ (these two inequalities are in fact always verified since they correspond to the mass balance in the ceramic):

$$I_f(t) = I_{f,1}(t) + I_{f,2}(t) = K_0 \frac{|\Delta E - \Delta E_{ion}|}{|\Delta E|} + K_0' \frac{|\Delta E - \Delta E_{ion}|}{|\Delta E|} \left( \frac{X_2}{C_2 \left(V_T - \frac{X_1}{C_1}\right)} \right)^n \qquad (2a)$$

In this equality $I_f(t)$ represents the charge transfer occurring within the bar or sample during polarisation, $I_{f,1}(t)$ is charge transfer related to re-oxidation of the bar, $I_{f,2}(t)$ represents oxygen exchanges within the bar.

Under strong pollution it was found that it is possible to observe a current ($I_p$) related to electrochemical reduction of the pollutants. It is not possible to relate this current to an overvoltage law but nevertheless an expression of current density representative thereof is used:

$$I_T = I_f + I_p \qquad (2b)$$

For $X_2 = 0$, the expression (2a) is reduced to:

$$frI_f(t) = I_{f,1}(t) = K_0 \frac{|\Delta E - \Delta E_{ion}|}{|\Delta E|} \qquad (2c)$$

The mass and charge balance is then expressed by the evolution rule of $X_1$ and $X_2$; for $X_2 \geq 0$:

$$\frac{dX_2}{dt} = -\frac{I_{f,2}}{2F} S \qquad (3a)$$

And for $0 \leq X_1 \leq C_1 V_T$ $$\frac{dX_1}{dt} = -\frac{I_{f,1}}{2F} S \qquad (3b)$$

with F being Faraday's constant (C/mol).

The operator (or automaton) has knowledge of $I_m$ (measured current) and $\Delta E$ (the potential applied to the terminals of the sample). These values can be stored in memory.

If it is written:

$$I_m = (I_f + I_p) S \qquad (4a)$$

Assuming that the time constant of the pollution-related current is lower than the constant which corresponds to internal regeneration of the ceramic:

$$\frac{dI_m}{dt} = \frac{dI_f}{dt} S \qquad (4b)$$

To determine the level of re-oxidation, it is sought to know $X_1$ (amount of oxygen available for re-oxidation).

The front position is expressed by:

$$(V_T - X_1/C_1)/S$$

By analysis of equations (2a) and (3a), it is shown by combining equations (2c) and (3b) that for $dI_m/dt \geq 0$ (the case $dI_m/dt < 0$ corresponds solely to internal exchanges without reduction or regeneration) the front position of $\delta$ can be written:

$$\delta = L_{regenerative} - \frac{1}{C_1 S2F} \frac{I_m(I_m - I_p)}{\frac{dI_m}{dt}} + \frac{\Delta E}{K_0} \sigma_{ion}^{eff}$$

$L_{Regenerative}$ represents the length that it is possible to regenerate ($L_{Regenerative}$ can be taken to be slightly shorter than the length of the bar to take into account electrode dimensions). The second and third parts of the $2^{nd}$ member (which are the terms in $-1/C_1S2F$ and $\Delta E/K_0$) of the above expression give the reduced length.

Therefore δ can have a value higher than $L_{Regenerative}$ on account of the pollution-related current $I_p$ which can be determined by a current at $$I_{\frac{dI}{dt}=0}$$

and/or by measuring the maximum value of the current at the time of interruption, or by any other electrochemical method allowing determination of pollutant concentration and to infer $I_p$ therefrom. This latter term is the contribution to the signal made by exchanges related to electrochemical reduction of pollutants in the environment.

By means of electrochemical measurements e.g. voltamperometry or complex electrochemical impedance, it is possible to determine $$\frac{\Delta E}{K_0} \sigma_{ion}^{eff},$$

but with variable accuracy depending on operating temperature (±10% at 900° C. and ±20% at 800° C.). Through geometric measurement and coulometry, at the time of total regeneration, and irrespective of temperature, it is possible to determine $$\frac{1}{C_1 S2F}$$

to within ±5%.

With this fine-tuned knowledge of the system under polarization, it is easy to stop regeneration when δ reaches a set value $\delta_s$: for as long as δ calculated using the above formula or a similar formula remains below this threshold $\delta_s$, regeneration is continued. It is halted when δ, estimated or calculated using the above formula or similar formula, becomes equal to or higher than this threshold value $\delta_s$.

In addition pollution may evolve; to give consideration thereto it is possible, by merely interrupting the regeneration current, to measure or record $I_p$ for example at regular time intervals e.g. every 5 or 10 seconds.

As indicated above, the parameters S and $\sigma_{ion}^{eff}$ $K_0$, $C_1$ can be determined or estimated. In addition, the percentage of uncertainty established on each of the parameters allows dimensioning of reducible length.

The above formula shows that the front position is dependent on $I^2_m/(dI_m/dt)$; if the atmosphere is not pure, this position is dependent on $I_m(I_m-I_p)/(dI_m/dt)$.

$dI_m/dt<0$ corresponds to internal exchanges within the sample which are very rapid.

The case $dI_m/dt=0$ corresponds to the case in which the sample exchanges oxygen with the outside of the sample.

$dI_m/dt>0$ corresponds to the case in which oxygen is released into the atmosphere outside the sample (this is a regeneration situation since oxygen is released from the sample).

Current measurements can be performed using an ammeter 6 arranged in series with the bar or sample 2.

The current values can be transmitted to data processing means 16.

These means 16 comprise a computer for example or micro-computer or calculator or an electrical circuit or a programmable or programmed electronic circuit or a microprocessor programmed to store in memory and process current data e.g. data supplied by the means 6, and data to implement a method according to the invention. In this manner the value δ of the regeneration front can be estimated or calculated.

For example, a central unit 17 is programmed to apply a processing method of the invention. In particular the values of current I for dI/dt=0 or the maximum value ($I_{inst\Delta E=0}$) of the current at the time of interruption or regeneration can be measured or estimated. The values of $dI_m/dt$ can be estimated by numerical derivation (so-called «naive» method), for example for a time interval imposed by the operator (e.g. 5 to 100 seconds). As a variant, the means 17 apply another method e.g. fast-scan voltammetry or square-wave potential technique or low frequency complex impedance spectroscopy. These methods can be accompanied by a calibration step and the correlation which relates their results to Ip can be more or less complex.

In addition the values of $$\frac{\Delta E}{K_0} \sigma_{ion}^{eff} \text{ and } \frac{1}{C_1 S2F}$$

may be previously measured and also stored in memory in the means 17.

On the basis of these data, the means 17 can estimate or calculate the value δ of the regeneration front.

These means 17 can also allow a comparison between this value of δ and a threshold value, and controlling of the switch 8 used to stop circulation of the regeneration current in the sample 2.

On the monitor or visualizing means 19 it is possible for example to display the changes in measured current as a function of time and/or changes in δ.

Figure 3:
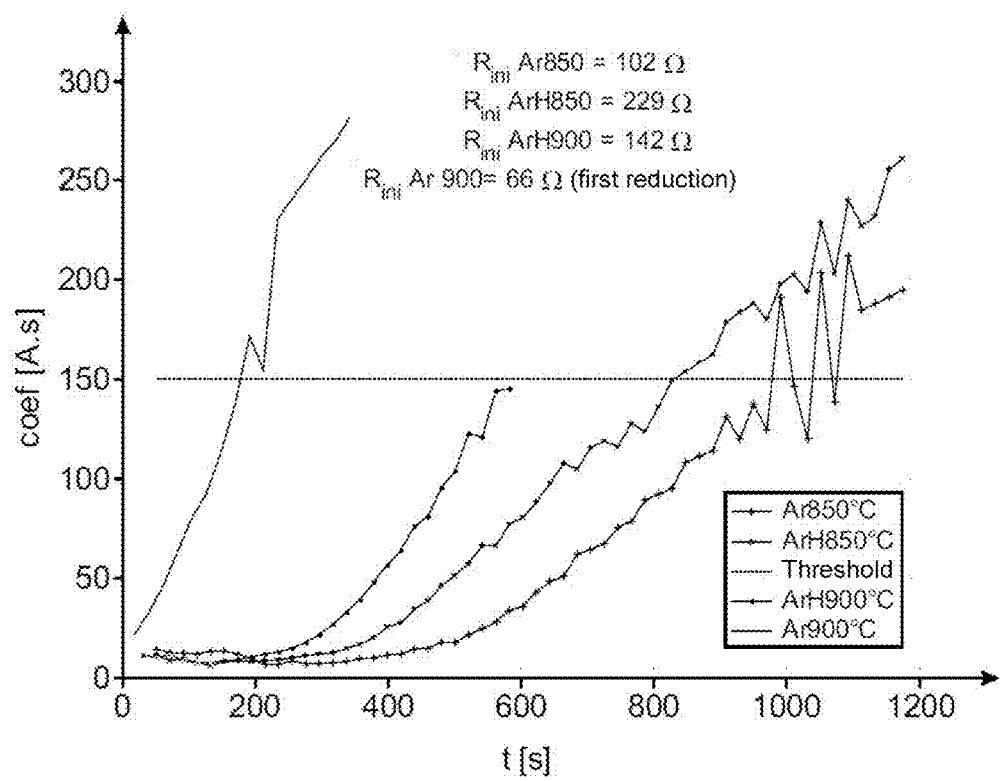
FIG. 3 illustrates monitoring of $I_m(I_m-I_p)/(dI_m/dt)$ as a function of time.

FIG. 3 illustrates different monitoring operations of the criterion $I_m(I_m-I_p)/(dI_m/dt)$, with $I_p$ close to 0. The initial resistances were measured at the terminals of a parallelepiped bar of dense 8YSZ material (8 mole % yttrium-stabilized zirconium (YSZ)). The measuring technique used was high frequency impedance. The operating temperatures were 900° C. and 850° C. These resistances exhibited strong variability depending on historical data of preceding regenerations. The criterion $I_m(I_m-I_p)/(dI_m/dt)$ was measured during reductions under argon (Ar) and 3% hydrogenated Argon (ArH). During regeneration under ArH at 900° C., regeneration was stopped at a target value of 150 A.s.

Figure 4:
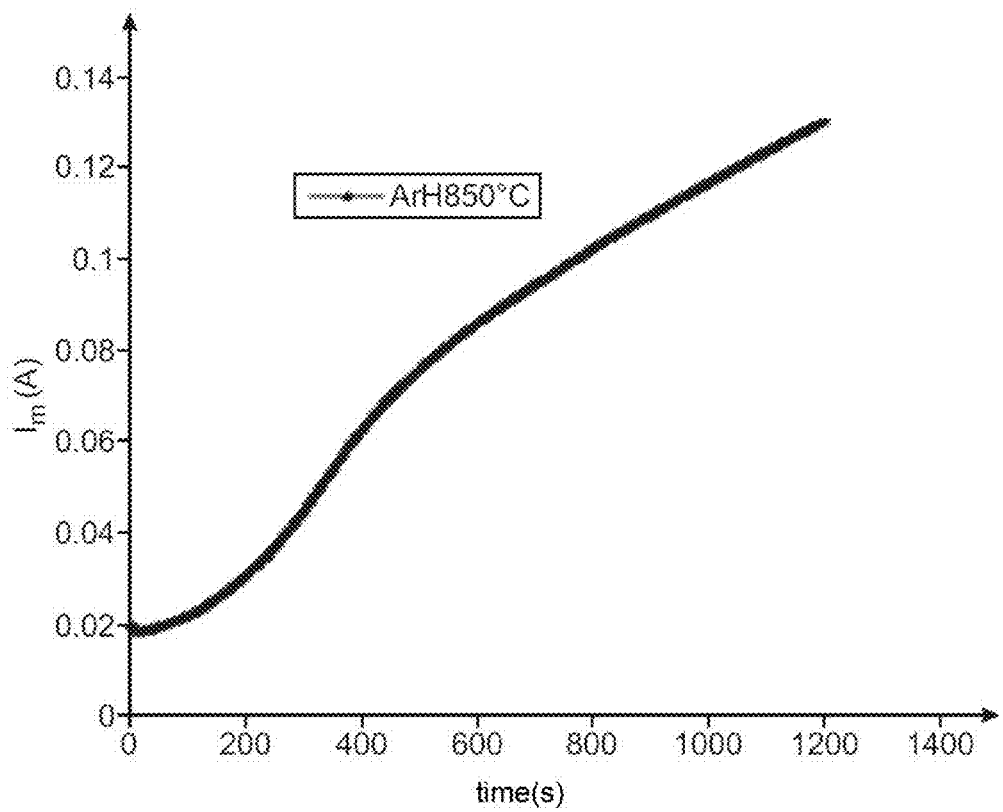
FIG. 4 is an example of the monitoring of current $I_m$ as a function of time according to a method of the invention.

FIG. 4 illustrates monitoring of the current as a function of time for 3% hydrogenated argon gas at 850° C., under 5 V polarization (same case as in FIG. 3).

Figure 5:
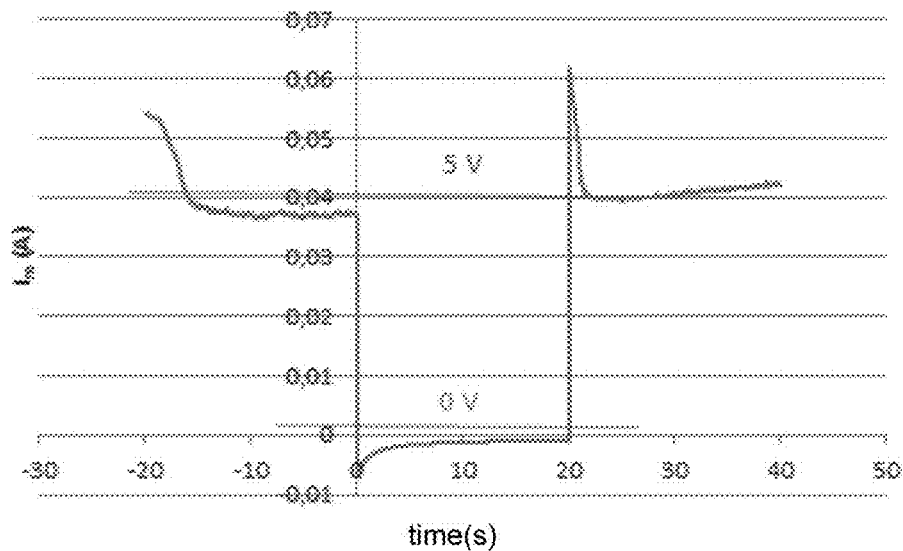
FIG. 5 is an example of the monitoring of current $I_m$ as a function of time according to a method of the invention, with determination of $I_p$.

FIG. 5, for a porous cylindrical sample at 850° C. under argon, illustrates monitoring of reducing current under 5 V and an example of Ip determination technique. After a reducing time of 200 seconds of a sample already partly reduced (which is the most complex case), the regeneration process was interrupted and the short circuit current was measured (zero potential): this is the current interruption technique. In the case in hand the measurement gave $I_p=I$ (dI/dt=0)=0.6 mA.

Figure 6:
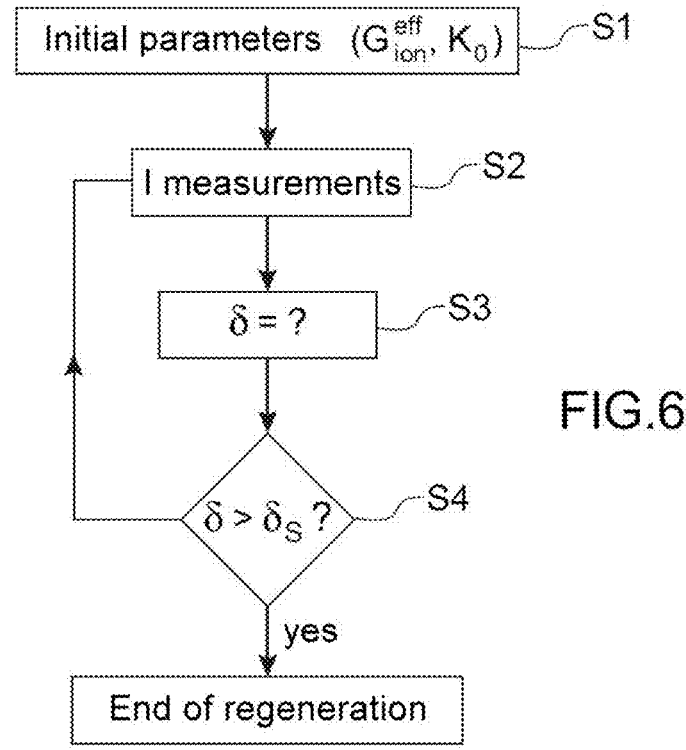
FIG. 6 is an example of a method according to the invention.

An example of a method which can be implemented according to the invention is schematically illustrated in FIG. 6.

At a first step (S1), a certain number of initial parameters can be measured or calculated e.g. $\sigma_{ion}^{eff}$, $K_0$, $C_1$. It is possible to infer $$\frac{\Delta E}{K_0}\sigma_{ion}^{eff} \text{ and } \frac{1}{C_1 S2F}$$

therefrom.

Measurements of I are then performed (step 2) in particular for $I_p=I(dI/dt=0)$ or for $Ip \propto I_{inst\Delta E=0}$.

From these measured values it is possible to estimate or calculate value δ (step S3).

As a function of the result of comparison between this value and a threshold value $δ_s$, it can be decided to stop or continue regeneration (step S4). In the latter case measurements of I are continued (step S2).

Regeneration according to the invention can be carried out automatically after a certain time of use of the getter. Regeneration can be triggered by the means 17 programmed for this purpose e.g. on the basis of a clock signal. As a variant, a potential application test is applied e.g. for a time of 5 to 10 seconds and current $I_m$ is measured; also, a current $I_E$ is estimated as a function of the applied potential and of estimated regenerated length (application of Ohm's law); if the estimated current $I_E$ is higher than the measured current $I_m$, regeneration is triggered.

Figure 7A:
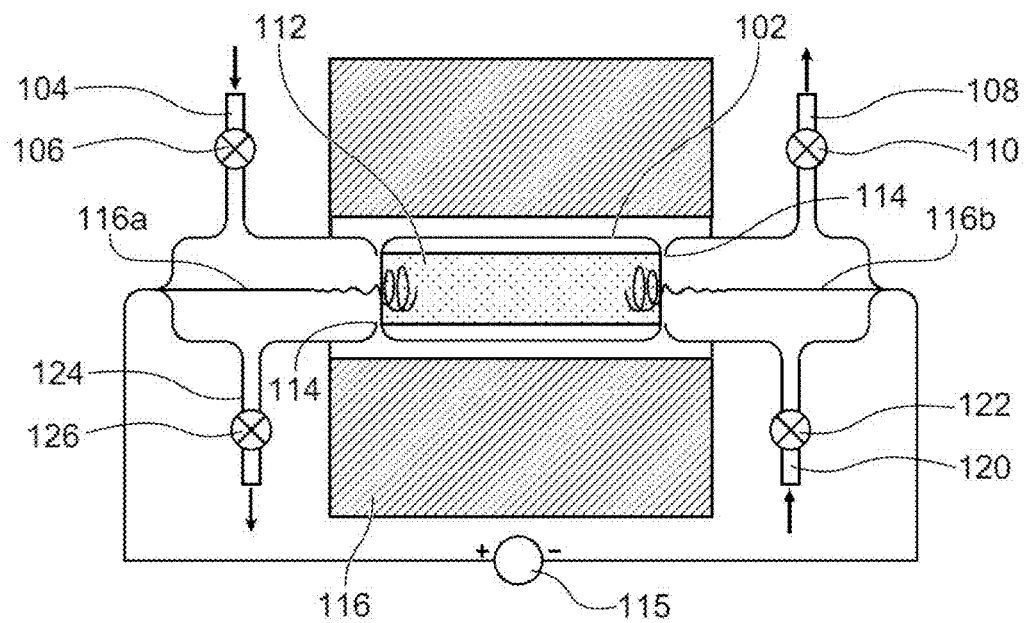
FIGS. 7A and 7B are examples of a gas purifying device to which the invention can be applied.
Figure 7B:
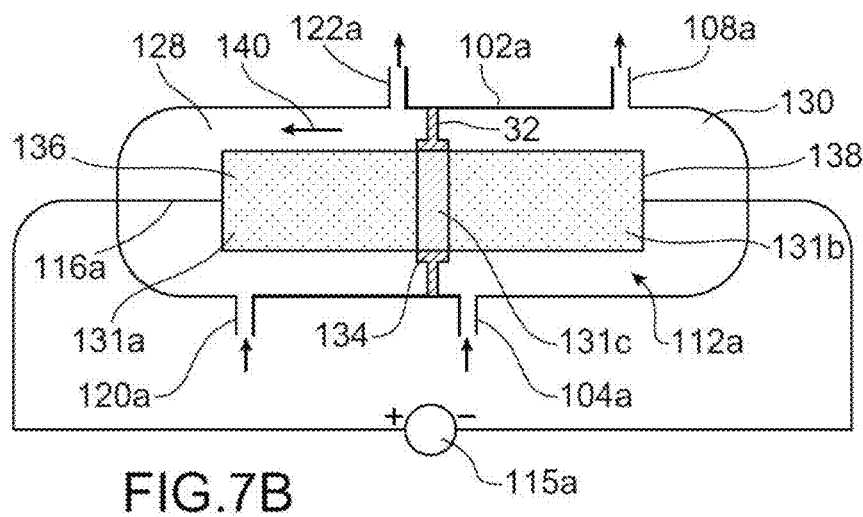

FIGS. 7A and 7B illustrate 2 devices to which the invention can be applied; these devices are described in document FR 2230402.

The device in FIG. 7A comprises an enclosure 102, inlet means for the gas to be purified comprising a connector 104 controlled by a valve 106 and means to evacuate this gas from the enclosure comprising a connector 108 controlled by a valve 110. Inside the enclosure there is a porous block 112 of getter material e.g. formed of a solid solution such as defined above. The gas entering via connector 104 can only be evacuated via connector 108 after it has passed through the porous block 112.

Here the enclosure 102 and the block 112 both have a general cylindrical shape, the block being held in position in this enclosure via bottleneck regions 114 for example formed in the enclosure.

The block 112 is inserted in an electric circuit comprising a generator of direct or rectified current 115 the terminals of which are electrically connected to opposite ends of the block, for example via metal conductors, 116a, 116b simply placed in contact with the solid electrolyte. In the experimental enclosure in FIG. 7A they are embedded in the ends of the block 112, their securing having been achieved by co-sintering with the block during the formation thereof.

An oven 116 surrounds the enclosure 102, at least the part thereof in which the block 112 is positioned, this oven being able to bring the solid solution to the temperature at which it has notable ionic and electronic conductivities, for example in the order of 600° C. to 800° C., when the block is formed of the solid solution containing zirconium, yttrium and cerium oxides, in particular in the above-indicated proportions.

The apparatus also comprises means, particularly comprising a connector 120 and valve 122 to emit an inert gas or hydrogen inside the enclosure and means to evacuate this gas which particularly comprise a connector 124 and valve 126, these latter inlet and evacuation means preferably being arranged such that the input gas is caused to circulate in the opposite direction to the direction normally taken in a prior step by the gas to be purified.

The apparatus thus prepared operates as follows.

At a first stage the solid solution of the block 112 is converted to its "reduced form", in particular by passing an electric current through the block in a direction which results from the indication of the + and − polarities respectively associated with the conductors 116a and 116b. This step is performed by estimating the length of regeneration according to the present invention.

During this operation, the valves 106 and 110 are closed whilst valves 122 and 126 are open and allow a gas to pass through the porous block such as nitrogen or a neutral gas but also hydrogen which entrains the oxygen released by the electrochemical reduction operation.

This reduction operation can be accompanied by blackening of the porous mass.

On completion of this operation, the supply to the electric circuit is interrupted.

The oxygen trap is then able to function in particular under the following conditions.

Valves 122 and 126 are closed and valves 106 and 110 are open, the latter allowing the gas to be purified to enter the enclosure via the connector 104, to pass in contact with the porous block 112 and to be evacuated via connector 110.

The traces of oxygen contained in the gas to be purified are then energetically fixed by the solid solution of the block 112.

According to document FR 2230402, observation of colouring of the block allows the moment to be estimated on and after which its adsorption capacity is exhausted, since it only returns to white when it has been fully re-oxidized. However this is not achievable when the process is in progress on account of temperature; it is this problem that is solved by the present invention.

By monitoring the current $I_m$ as proposed herein, it is possible to observe the level of reduction or re-oxidation as shown in FIG. 5 for example.

Oxygen adsorption is rapid irrespective of the degree of oxidation of the solid solution, and in particular the rate of oxygen adsorption is not substantially affected by this degree of oxidation for as long as it remains lower than its value in natural solid solutions.

When this maximum degree of oxidation is reached, the solid solution is regenerated by converting it to its reduced form under the conditions of the present invention indicated above.

The trap just described is therefore capable of operating discontinuously.

FIG. 7B illustrates a variant of this oxygen trap, this variant being able to operate continuously. The different parts of the apparatus in FIG. 7B have been given the same reference numbers as the corresponding parts of the apparatus in FIG. 7A, together with an index. Only different parts have been given new reference numbers.

The apparatus in FIG. 7B essentially differs from the one in FIG. 5A in that the enclosure 102a is divided into two separate compartments 128 and 130, in that the block 112a comprises two parts 131a, 131b contained in compartments 128, 130 respectively, and in that a gas-tight separation is formed between the two compartments and between the above-said parts 131a, 131b, without the gases in contact with one of said parts being able to diffuse in the gaseous state into the other through the bulk of the block.

Advantageously, the parts 131a, 131b of the block 112a are porous and separated by a compact or solid central portion 131c, the separation between the two compartments 128, 130 being obtained via a partition 132 in which a central opening is provided allowing passage into the block 112a, in the central portion thereof, a seal for example in enamel providing imperviousness between the central portion 131c and the edges of the opening in the partition 132.

The block 112a is inserted in an electric circuit comprising a current generator 115a having its positive terminal connected to end 136 and negative terminal connected to end 138 of the block 112a, in compartments 128 and 130 respectively.

The entry of the gas to be purified is through the connector 104a into compartment 130, the purified gas being evacuated through connector 108a, whilst an inert gas is caused to enter compartment 128 via connector 120a and evacuated outside compartment 128 via connector 122a.

The traces of oxygen contained in the gas entering compartment 130 are therefore retained in the corresponding part of block 112a, in the form of ions which migrate in the bulk of the porous block in particular in the general direction indicated by arrow 140 when the generator is powered, these oxygen ions being converted to gaseous oxygen atoms in the vicinity of end 136 of the block 112a in contact with the conductor 116a to which the electrons are transferred.

A neutral or reducing gas such as purge hydrogen, caused to enter compartment 128 via connector 120a, entrains the gaseous oxygen or formed vapour towards the evacuation connector 122a.

The invention therefore particularly allows the applying of continuous mode purification.

It also, at any time, provides an indication of the re-oxidation level and hence allows best control over the system whether functioning in discontinuous or continuous mode.

The invention has been described with a solid cylindrical bar 2, but other shapes of samples can be used.

More generally, the material of the trap 2 is of elongate shape e.g. cylindrical or parallelepiped.

Figure 8A:
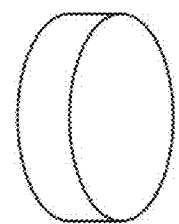
FIGS. 8A and 8B are examples of shapes of oxygen traps.
Figure 8B:
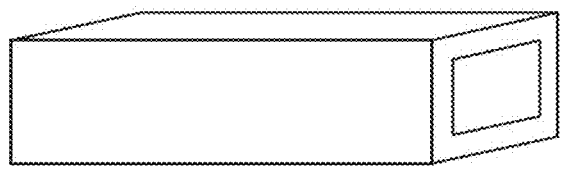

As a variant, it may be in the form of a pellet (FIG. 8A) or hollow tube, with circular, rectangular or square cross-section (case in FIG. 8B). The shape of the electrodes applied to the sample (such as electrodes 7, 9 in FIG. 2) is adapted to the shape of the sample.

Irrespective of shape, the sample may be composed of a material which may be porous or dense.

The gas to be purified with the getter may be hydrogen or any other neutral gas e.g. of the type used in the field of microelectronics such as argon, helium or nitrogen.

Examples of application of the invention are the following:
  purification of pollutants such as $CO_2$, $H_2O$, CO and NO in a neutral carrier gas or hydrogen;
  purification of He or $H_2$ for analysis by gas phase chromatography (GPC);
  purification of $H_2$ for on-hydride hydrogen storage;
  purification of $H_2$ for use in fuel cells;
  purification of $H_2$ for microelectronic processes;
  purification of neutral gases such as argon or nitrogen for any industrial use.

The invention claimed is:

1. A method to regenerate an oxygen trap using an electric current, comprising at least the following steps:
    a) circulating, by a circuit and a voltage source, an electric current in a material of the trap to reduce the material;
    b) measuring, by an ammeter, a value Im of said electric current and estimating a derivative dIm/dt of the measured current Im in relation to time;
    c) estimating, by a calculator, a length ($\delta$) of material reduced by said electric current, as a function of the value of said current (Im) and of said derivative (dIm/dt);
    d) stopping, by a switch, circulation of the current when the length of reduced material is at least equal to a threshold value ($\delta s$).

2. The method according to claim 1 wherein the length of reduced material is a function of the ratio $Im^2/(dIm/dt)$ between the square of the measured current and its derivative when the derivative dIm/dt is not zero.

3. The method according to claim 1 further comprising measuring or estimating a contribution, to the measured current, made by electrochemical reductions of pollutants in the environment of the trap, wherein the length ($\delta$) of reduced material is estimated in step c) as a function of the value of the measured current (Im), of the estimated derivative (dIm/dt), and of the measured or estimated contribution, to the measured current, made by the electrochemical reductions of pollutants.

4. The method according to claim 1 wherein a value is also measured of the current (Ip=I(dI/dt=0)) for a zero or near-zero derivative thereof, and wherein the length of reduced material is estimated as a function of the value of said current (Im), of its derivative (dIm/dt) and of the value of the current (Ip=I(dI/dt=0)) for a zero or near-zero derivative thereof.

5. The method according to claim 4 wherein the length of material is a function of the ratio Im(Im−Ip)/(dIm/dt) between the product of the electric current and the electric current corrected for the current value when the current is substantially constant, and the derivative of the current when the derivative dIm/dt is not zero.

6. The method according to claim 3 wherein the circulation of current is interrupted and the value of the current (Ip=I(dI/dt=0)) is measured for a zero or near-zero derivative thereof.

7. The method according to claim 6 wherein the interruption of the current and measurement of the value of the current (Ip=(dI/dt=0)), for a zero or near-zero derivative thereof, are performed at regular time intervals.

8. The method according to claim 1 wherein regenerating the oxygen trap takes place at a temperature between 600° C. and 900° C.

9. The method according to claim 1 wherein the trap material is a solid ZrYO or ZrScO solution, or a $ThO_2$_ and $LaGaO_3$_ structure with or without double substitutions of $Y_2O_3$ or $Sc_2O_3$ by $CeO_2$ or $Al_2O_3$, or a $8(Y_2O_3).10(Al_2O_3)$ mixture.

10. A method to regenerate an oxygen trap using an electric current, comprising at least the following steps:
    a) circulating, by a circuit and a function generator, an electric current in a material of the trap to reduce the material;
    b) measuring, by an oscilloscope, a value Im of said electric current and estimating its derivative dIm/dt in relation to time;

c) estimating, by a calculator, a length ($\delta$) of material reduced by said electric current, as a function of the value of said current (Im) and of its derivative (dIm/dt);

d) stopping, by a switch, circulation of the current when the length of reduced material is at least equal to a threshold value ($\delta s$), wherein, owing to said oscilloscope, a measurement or estimate is calculated of the contribution, to the measured current, made by electrochemical reductions of pollutants in the environment of the trap, and the length ($\delta$) of reduced material is estimated in step c) as a function of the value of the measured current (Im), of the derivative (dIm/dt), and of the contribution, to the measured current made by the electrochemical reductions of pollutants.

11. The method according to claim 1 wherein the instant (maximum) value is estimated of the current when it is interrupted.

12. The method according to claim 1 wherein a contribution to the measured current by electrochemical reductions of environment pollutants is estimated via fast-scan voltammetry, square-wave potential technique or low frequency complex impedance spectroscopy.

\* \* \* \* \*